United States Patent [19]

Ishiga

[11] Patent Number: 5,225,494
[45] Date of Patent: Jul. 6, 1993

[54] GRAFT COPOLYMER RESIN COMPOSITION

[75] Inventor: Narito Ishiga, Yokkaichi, Japan
[73] Assignee: Mitsubishi Monsanto Chemical Company, Tokyo, Japan
[21] Appl. No.: 496,959
[22] Filed: Mar. 21, 1990
[30] Foreign Application Priority Data Apr. 1, 1989 [JP] Japan ................................ 1-83097

[51] Int. Cl.$^5$ ........................................... C08F 279/02
[52] U.S. Cl. .................................. 525/316; 525/245; 525/260; 525/263
[58] Field of Search ................ 525/245, 260, 263, 316

[56] References Cited

FOREIGN PATENT DOCUMENTS 2115593 7/1972 France .
2239503 2/1975 France .
2068392 8/1981 United Kingdom .
2092604 8/1982 United Kingdom .

OTHER PUBLICATIONS

Atkins, P. W. "Physical Chemistry", Freeman, New York, 3rd edition (1986), pp. 615-616.

*Primary Examiner*—James J. Seidleck
*Assistant Examiner*—Vasu S. Jagannathan
*Attorney, Agent, or Firm*—Oblon, Spivak, McClelland, Maier & Neustadt

[57] ABSTRACT

A graft copolymer resin composition having improved impact resistance, particularly at low temperature, obtained by emulsion-polymerizing an aromatic vinyl monomer and a vinyl cyanide monomer, optionally together with an ethylenically unsaturated monomer copolymerizable therein under specific conditions by the action of a polymerization initiator in the presence of a latex of a conjugated diene polymer under specific conditions.

10 Claims, No Drawings

GRAFT COPOLYMER RESIN COMPOSITION

The present invention relates to a graft copolymer resin composition containing a rubbery polymer as the backbone polymer. The graft copolymer resin composition of the present invention is useful not only as the impact resistant resin material by itself but also as a blend resin to be incorporated to other resin to obtain an impact resistant resin composition.

Graft copolymerization is well known as one of the methods for obtaining impact resistant resins. For example, a graft copolymer resin composition obtained by polymerizing monomers capable of providing a resinous polymer (such as styrene+acrylonitrile) in the presence of a rubbery polymer (such as a latex of a conjugated diene polymer), is used practically as an impact resistant resin.

Modifications have also been made to such a graft copolymer resin. A number of proposals have been made for the purpose of improving the impact resistance and additionally for the purpose of improving the flowability and the appearance of the products. See, for example, Japanese Examined Patent Publications No. 18255/1971, No. 21943/1971, No. 41466/1971, No. 13779/1972 and No. 22340/1981, and Japanese Unexamined Patent Publications No. 15415/1975, No. 34911/1987 and No. 69814/1988.

Except for Japanese Unexamined Patent Publication No. 15415/1975 which is characterized by using an initiator soluble in monomers as an initiator for graft copolymerization, the proposals in these publications are all concerned with a combined use of two types of a rubbery polymer, a polymerization initiator or a graft copolymer.

However, so far as the present inventors know, no adequate impact resistance, particularly no adequate low temperature impact resistance, can be obtained by these proposals. Heretofore, various graft copolymerization conditions have been selected and tried to improve the impact resistance and the balance of physical properties of the graft copolymer resin composition. However, no graft copolymer resin composition provided with both the impact resistance and the balance of physical properties, has been obtained.

It is an object of the present invention to solve the above-mentioned problems. It is intended to accomplish this object by a graft copolymer resin composition obtained by conducting graft copolymerization under certain specific conditions. The present invention provides a graft copolymer resin composition obtained by emulsion-polymerizing an aromatic vinyl monomer and a vinyl cyanide monomer, optionally together with an ethylenically unsaturated monomer copolymerizable therewith, by the action of a polymerization initiator in the presence of a latex of a conjugated diene polymer, and satisfying the following conditions:

(a) the conjugated diene polymer in the latex has a gel content of at least 50% by weight, (b) the conjugated diene polymer in the latex has a weight average particle size of from 0.20 to 0.65 μm, (c) the polymerization initiator is soluble in the monomers, (d) the conjugated diene polymer ratio R in this graft copolymer resin composition is from 0.35 to 0.80, (e) the soluble component when this graft copolymer resin composition is subjected to extraction with acetone at room temperature, has a weight average molecular weight of from 200,000 to 450,000, and (f) the insoluble component when this graft copolymer resin composition is subjected to extraction with acetone at room temperature, is in an amount satisfying the following formula (1) and (2):

$$Gr = \frac{y - x \cdot R \cdot 100}{x \cdot R} \quad (1)$$

$$\frac{30(1 - R)}{R} \leq Gr \leq \frac{80(1 - R)}{R} \quad (2)$$

where the symbols have the following meanings:

x: the weight of the graft copolymer resin composition sample, y: the weight of the room temperature acetone-insoluble component in x, R: the conjugated diene polymer ratio in the graft copolymer resin composition, and Gr: the graft ratio (%).

The graft copolymer resin composition is excellent in the impact resistance, particularly in the low temperature impact resistance. In spite of the high molecular weight of the resin portion, the flowability is good, and the balance of physical properties is excellent.

Now, the present invention will be described in detail with reference to the preferred embodiments.

GRAFT COPOLYMER RESIN COMPOSITION (PART 1)

Definition

The graft copolymer resin composition of the present invention is the one obtained by emulsion-polymerizing certain specific monomers in the presence of a latex of the conjugated diene polymer.

The graft copolymerization is conducted by polymerizing monomers in the presence of a polymer, whereby in addition to an ideal graft copolymer wherein the total amount of the monomers are bonded as "branches" to the "backbone" of the polymer, polymers of the monomers themselves will usually be produced by side reactions. Therefore, it is usual that the product of graft copolymerization is a mixture of various polymers. This is the reason why the product of graft copolymerization is referred to as "a graft copolymer resin composition" in the present invention, and this is the reason why the condition (e) has a significance.

The graft copolymer resin composition of the present invention is specified by the conditions (a) to (c) relating to its production and by the conditions (d) to (f) relating to the composition itself.

PREPARATION OF THE GRAFT COPOLYMER RESIN COMPOSITION

Latex of a conjuqated diene polymer (1) monomer species

In the present invention, by conjugated diene polymer is meant a polymer which owes its rubbery nature primarily to the conjugated diene component.

Conjugated dienes which are commonly used as conjugated dienes for rubbery polymers and which are preferred in the present invention, are 1,3-butadiene, isoprene, 1,3-pentadiene, piperylene and chloroprene, particularly, 1,3-butadiene and isoprene, most preferably 1,3-butadiene.

The conjugated diene polymer may be a homopolymer of such a conjugated diene or a copolymer of such conjugated dienes. Further, it may be a copolymer of such a conjugated diene with an ethylenically unsaturated monomer copolymerizable therewith. Specific examples of such a comonomer include an aromatic vinyl monomer, a vinyl cyanide monomer (in each case, for specific examples, please refer to the specific examples of the graft copolymer mentioned hereinafter), an ester of an acrylic acid or methacrylic acid with a $C_1$-$C_{10}$ alkanol (such as n-butyl alcohol, i-butyl alcohol), an $\alpha$-olefin such as isobutylene, a diene monomer such as divinyl benzene or a (poly)alkylene glycol di(meth)acrylate, etc. Among these, the first two, particularly styrene and acrylonitrile, are representative. The content of the conjugated diene units in the copolymer is preferably at least 50% by weight, more preferably at least 60% by weight. If the content of the conjugated diene units is less than 50% by weight, the rubber elasticity tends to be inadequate, and consequently the impact resistance of the resulting composition tends to be low.

Accordingly, preferred specific examples of the conjugated diene polymer to be used in the present invention, are poly-1,3-butadiene, polyisoprene, a butadiene-styrene copolymer (so called SBR), and butadiene-acrylonitrile copolymer (so called NBR).

The latex of such a conjugated diene polymer can be prepared by emulsion-polymerizing a monomer mixture comprising from 50 to 100% by weight of the conjugated diene and from 0 to 50% by weight of the above-mentioned comonomer in an aqueous medium all at once or stepwise.

In the present invention, the latex of the conjugated diene polymer (hereinafter sometimes referred to simply as the rubber) is required to satisfy specific conditions with respect to the gel content of the conjugated diene polymer and the particle size of the conjugated diene polymer.

(2) Gel content (condition (a))

The conjugated diene polymer is the one having a gel content of at least 50% by weight, preferably from 60 to 97% by weight.

If the gel content is less than 50% by weight, a molded product from the resulting composition tends to undergo a deformation of the graft copolymer, whereby a balance of e.g. outer appearance tends to be substantially impaired (the conjugated diene polymer having such a low gel content also has a problem that its production process tends to be complicated).

Such a conjugated diene polymer having a high gel content, can be produced by adjusting the emulsion polymerization conditions such as the polymerization temperature, the type and amount of the polymerization initiator to be used for the polymerization reaction, and the type and amount of the cross linking agent.

(3) Size of rubber particles (condition (b))

The conjugated diene polymer in the latex has a weight average particle size of from 0.20 to 0.65 $\mu$m, preferably from 0.25 to 0.50 $\mu$m.

If the size of rubber particles is as small as less than 0.2 $\mu$m, there is an advantage that the molded product as the final product has excellent gloss, but there will be disadvantages such that the moldability (flowability) for forming the final product tends to be poor, and the important impact resistance tends to be low, whereby the rubber incorporation effects tend to be poor. As a whole, there will be a disadvantage from the viewpoint of the balance of various properties.

On the other hand, if rubber with a large particle size, for example, with a rubber particle size of more than 0.65 $\mu$m is used, there will be an advantage that the impact resistance will be improved, but the gloss of a molded product as the final product tends to be low, or the rigidity as an important characteristic of this resin tends to be low, and there will be a disadvantage from the viewpoint of the balance of various properties.

Such a rubber latex having a relatively large particle size, may be the one obtained by subjecting a latex having a small particle size to an operation for enlarging the particle size in order to obtain the desired particle size.

The particle size enlargement may be conducted by known methods, such as a method wherein a latex is once frozen and then dissolved again, a method wherein a mineral acid or an organic acid is added to the latex to temporarily reduce the pH of the latex, or a method wherein a shearing force is exerted to the latex (Japanese Unexamined Patent Publications No. 133588/1979 and No. 202211/1984). It is particularly preferred to adopt a method of adding phosphoric acid or acetic anhydride to the latex, since it is thereby easy to control the particle size.

The particle size is required to be within the above range. However, the particle size distribution of the rubber particles is not required to be a so-called monomodal where the particle size distribution curve has a single peak and may be a bimodal where the particle size distribution curve has a plurality of peaks, for example, two peaks. In the case of a bimodal particle size distribution, the rubber particle size on the weight average of the two latexes may be within the range of from 0.20 to 0.65 $\mu$m.

Graft copolymerization

The graft copolymer resin composition of the present invention is the one obtained by emulsion-polymerizing an aromatic vinyl monomer and a vinyl cyanide monomer optionally together with other comonomer in the presence of the above-mentioned latex of a conjugated diene polymer.

(1) Aromatic vinyl monomer, etc.

The aromatic vinyl monomer to be used in the method of the present invention, includes styrene, a side chain or/and ring-substituted styrene (the substituents include a lower alkyl group, a lower alkoxy group, a trifluoromethyl group, a halogen atom, etc.) such as $\alpha$-methylstyrene, t-methylstyrene, o-methylstyrene, m-methylstyrene, a ring-halogenated styrene, and $\alpha$- or $\beta$-vinylnaphthalene. These monomers may be used in combination.

The vinyl cyanide monomer to be used in the method of the present invention includes acrylonitrile and methacrylonitrile. They may be used in combination.

The comonomer copolymerizable with the above-mentioned aromatic vinyl monomer and vinyl cyanide monomer, may be an ester of acrylic acid or methacrylic acid with an alkanol having from 1 to 10 carbon atoms, such as methyl acrylate and methyl methacrylate, or a diene monomer (provided that a small amount is used in combination with the above-mentioned monomers) such as divinylbenzene and a (poly)alkylene glycol di(meth) acrylate, or the like.

The aromatic vinyl monomer (S), the vinyl cyanide monomer (A) and the comonomer (C) are preferably in such amounts that the weight ratio of A/(A+S+C) is from 20 to 45% by weight, preferably from 25 to 40% by weight. The comonomer (C) is used in an amount such that the weight ratio of C/(A+S+C) is up to 40% by weight, preferably up to 30% by weight.

(2) Polymerization initiator (condition (c))

In the present invention, the polymerization initiator to be used for the graft copolymerization is the one soluble in the monomers (i.e. the monomers for the graft copolymerization). The aromatic vinyl monomer constituting the main component of the monomer mixture, is oily. Therefore, the initiator of the present invention is usually oil-soluble. However, in the present invention, "soluble in the monomers" does not mean that the initiator is soluble only in the monomers. Namely, the polymerization initiator to be used in the present invention, may be soluble in water to some extent.

The decomposition of the initiator to initiate the polymerization, may be conducted not only by a physical means such as heating or ultraviolet irradiation, but also by a chemical means by means of a reducing agent when the initiator is peroxide. Thus, in the present invention, "the polymerization initiator" includes a so-called redox system combined with a reducing agent as well as a system in combination with a photosensitizer in the case of the ultraviolet irradiation.

As a thermally decomposable initiator, the one having a half-life of from 1 to 10 hours at 80° C. is suitable. If the half-life is less than 1 hour, a coagulated product may be formed during the emulsion polymerization, whereby the outer appearance and the impact strength of the resulting resin tend to be inferior. On the other hand, if the half-life exceeds 10 hours, the polymerization speed is too slow, and a coagulated product is likely to form, such being undesirable.

As such a polymerization initiator, acetyl peroxide, benzoyl peroxide, tert-butyl peroxy-2-ethylhexanoate, m-toluoyl peroxide, tert-butyl peroxyisobutyrate, 2,2'-azobisisobutylonitrile, dimethyl-2,2'-azobisisobutyrate, or 4,4'-azobis-4-cyanobvaleric acid may be mentioned.

As the redox system polymerization initiator, it is preferred to employ a combination comprising as a reducing agent a ferrous salt such as ferrous sulfate and as an oxidizing agent an organic hydroperoxide such as cumene hydroperoxide, diisopropylbenzene hydroperoxide or p-methane hydroperoxide. In such a case, dextrose, sodium pyrophosphate or the like may be employed as an aid for controlling the redox reaction rate.

In the present invention, good results are obtained by using such a polymerization initiator. It is believed that by using the polymerization initiator soluble in the monomers, high impact resistance is obtained by partial enlargement of the size of rubber particles due to the polymerization of the monomers in the interior of rubber and by the change of the rubber properties due to the graft polymerization of the monomers in the interior of rubber.

(3) Other conditions

The graft copolymerization may be conducted in the presence of a chain transfer agent.

There is no particular restriction as to the chain transfer agent to be used in the present invention. However, it is usual to employ a mercaptan compound such as n-octylmercaptan, t-dodecylmercaptan or terpinolene, or α-methylstyrene linear dimer.

The polymerization temperature condition for the graft copolymerization is suitably within a range of from 50° to 85° C., preferably from 55° to 75° C. If the temperature is less than 50° C., the polymerization reaction rate is small and not practical. On the other hand, if the temperature exceeds 85° C., formation of coagulated substance or deposited substance tends to increase, the polymerization yield decreases, and the quality of the final products tends to be low, such being undesirable.

Other conditions for the graft copolymerization are not essentially different from those commonly employed for the production of an ABS resin. The monomers for the graft copolymerization may be introduced to the polymerization system all at once or stepwise. The polymerization in this step is emulsion polymerization. If the emulsifier supplied from the latex of the conjugated diene polymer is insufficient, the same type of the emulsifier or a different emulsifier may be added. The temperature during the polymerization may be changed with time.

GRAFT COPOLYMER RESIN COMPOSITION (PART 2)

The graft copolymer resin composition of the present invention is required to satisfy the following conditions with respect to the conjugated diene polymer ratio, the molecular weight of the resin composition and the graft ratio.

The conjuqated diene polymer ratio in the composition condition (d))

As mentioned above, the graft copolymer resin composition of the present invention is the one obtained by emulsion polymerizing the aromatic vinyl monomer, etc. in the presence of the latex of the conjugated diene polymer. This conjugated diene polymer is in such an amount that the conjugated diene polymer ratio (weight ratio) R in the resulting graft copolymer is from 0.35 to 0.80, preferably from 0.40 to 0.70. If R is less than 0.35, it becomes difficult to obtain impact resistance of the resulting composition, and the effects as the impact resistance-improving agent tend to decrease. On the other hand, if R exceeds 0.80, graft copolymerization tends to be difficult, coagulation of the conjugated diene polymer particles is likely to take place, and when the resulting composition is molded, the gloss of the molded products tends to be impaired, and the impact resistance will be low.

Molecular weight of the resin component (condition (e))

As is common in the case of emulsion-polymerizing monomers for forming a resinous polymer by the action of a polymerization initiator in the presence of a latex of a rubbery polymer, also in the present invention, polymers of the aromatic vinyl monomer, etc. themselves are coexist in the graft copolymer resin composition produced, as described above.

In the present invention, these polymers are regarded as soluble in acetone at room temperature, and their molecular weight is specified to be from 200,000 to 450,000, preferably from 220,000 to 400,000 (the details of the measuring method will be given hereinafter).

If this molecular weight is less than 200,000, it becomes difficult to attain a high level of impact resistance with the resulting graft copolymer resin composition. On the other hand, if the molecular weight exceeds 450,000, the moldability and the dispersibility of the graft rubber particles tend to be poor, and the appearance and the impact resistance of the molded products tend to be poor.

Graft ratio (condition (f))

In the present invention, among the polymers derived from the monomers for forming the resinous polymer, other than the above-mentioned acetone-soluble component is regarded as chemically bonded to the rubbery polymer, i.e. as graft bonded. The degree of the graft bonding is represented by the numerical value defined by the following formula (1) as a graft ratio % (Gr). This graft ratio is specified to be within the range shown by the following formula (2) with respect to the relation with the diene polymer ratio in the graft copolymer resin composition.

$$Gr = \frac{y - x \cdot R \cdot 100}{x \cdot R} \qquad (1)$$

$$\frac{30(1 - R)}{R} \leq Gr \leq \frac{80(1 - R)}{R} \qquad (2)$$

Here, x is the weight of a sample of the graft copolymer resin composition to be measured, y is the weight of the room temperature acetone-insoluble component in it, and R is the conjugated diene polymer ratio (weight ratio) in the graft copolymer resin composition.

In order to obtain high impact resistance with the graft copolymer resin composition of the present invention, there exists the optimum graft ratio % (Gr) as shown by the above formula (2) depending upon the weight ratio (R) of the rubber. If the graft ratio is outside this range, the appearance and the impact resistance of the molded products tends to be inadequate.

The graft ratio defined as above can be adjusted to a desired level by adjusting the types, amounts and/or the methods for addition of the polymerization initiator, the chain transfer agent and the emulsifier at the time of the graft copolymerization or (and) controlling the polymerization time and temperature, etc.

GRAFT COPOLYMER RESIN COMPOSITION (PART 3)

Except for the definitions for various conditions, the graft copolymer resin composition of the present invention is fundamentally not different from the common resins of this type i.e. from ABS resins.

Accordingly, various assisting materials such as an organic or inorganic filler, a stabilizer, an ultraviolet absorber, a lubricant, a compatibilizing agent, a colorant, etc, which are commonly employed for ABS resins or polyblended thermoplastic resins, may be incorporated to the graft copolymer resin composition of the present invention, and the composition can be formed into pellets or other molding material, or to a final molded product by means of a usual apparatus capable of heating, melting and kneading the composition.

The graft copolymer resin composition of the present invention can be used by itself as an impact resistant resin. Not only that, it can be used as blended with other thermoplastic resins compatible therewith. As such thermoplastic resins, a homopolymer and copolymer of the aromatic vinyl monomer (the comonomer being a vinyl cyanide monomer, a $C_1$-$C_{10}$ alkanol ester of acrylic acid or methacrylic acid, etc.), a polyamide, a polycarbonate and polyphenylene oxide may be mentioned as representative examples.

Now, the present invention will be described in further detail with reference to Examples and Comparative Examples. However, it should be understood that the present invention is by no means restricted by such specific Examples.

In the following Examples and Comparative Examples, the physical properties of the impact resistant styrene resins were measured in accordance with the following methods.

(1) Izod impact strength:
Measured in accordance with JIS K7110.
(2) Tensile strength:
Measured in accordance with JIS K7113.
(3) Falling dart impact strength:
Measured by means of a falling dart impact strength tester "Dynatup Model ETI-300" manufactured by Effects Technology, Inc.

The thickness of the sample was 0.26 cm and the window size of clamping plate had a size of 7 cm ×8 cm. The diameter of tup was 1.27 cm and the initial impact velocity was set at 4.43 m/sec.

The sample-supporting table had a size of 7 cm ×8 cm, and the thickness of the sample was 0.3 cm.

The dropping weight employed was a cylinder having a diameter of 1.27 cm with the forward end being spherical and had a weight of 4.45 kg.

The speed of the dropping weight at the time of colliding with the sample was set at 4.43 m/sec.

(4) Melt flow rate:
Measured under the conditions of 220° C. and 10 kg in accordance with JIS K7210, and represented by the amount (g) of the material flowed out for 10 minutes.

(5) Appearance:
Measured in accordance with JIS K7105, and represented by the numerical value of the specular gloss at 60°.

(6) Average particle size of the latex:
The average particle size of the latex was measured by means of "Nanosizer" manufactured by Coulter Electronics Ltd., USA.

(7) Concentration of the solid content:
Moisture was evaporated from the sample latex in a constant temperature dryer, and the weight of the residue thereby obtained was measured and represented by the percentage relative to the weight of the sample latex.

(8) Gel content:
To 50 ml of toluene of guaranteed grade, 0.5 g of dried powder (a conjugated diene polymer, the same applies hereinafter) was added, and the mixture was left to stand at room temperature for 48 hours under a light-shielding condition. Then, the dried weight of the non-dissolved component obtained by the filtration with a metal net of 100 mesh, was measured and represented by the percentage relative to the weight of the dried rubber powder.

(9) Molecular weight, graft ratio:
(i) A predetermined amount (x) of a graft copolymer was put into acetone and left to stand overnight. The mixture was subjected to ultrasonic cleaning for 15 minutes to completely dissolve and disperse the free copolymer and then subjected to centrifugal separation at 20,000 rpm for 1 hour using a centrifugal separator, to obtain a soluble component. The soluble component was evaporated to dryness and dried overnight at 60° C. using a vacuum dryer, to obtain sample (A). For the determination of the molecular weight, a tetrahydrofuran solution of sample (A) was prepared, and the molecular weight was measured by GPC. (gel permeation chromatography). The molecular weight is represented by a value calculated as polystyrene.

(ii) The centrifugal separation was repeated twice in accordance with the above method to obtain an insoluble component. This insoluble component was dried overnight at 60° C. by means of a vacuum dryer, to obtain an insoluble component (y). The graft rate was calculated by the following equation.

$$\text{Graft ratio (\%)} = \frac{(y) - (x) \cdot \text{The rubber ratio } (R) \text{ of the graft copolymer resin composition}}{(x) \cdot \text{Rubber ratio } (R) \text{ of the graft copolymer resin composition}} \times 100$$

The rubber ratio (R) of the graft copolymer resin composition can be calculated from the conjugated diene polymer used and the polymerization degree of the graft copolymer. However, to obtain the rubber ratio of the given graft copolymer resin composition, the above-mentioned acetone-insoluble component is subjected to an ozone decomposition method or an IR method to measure the rubber content, and the rubber ratio can be calculated from the measured value.

EXAMPLE 1

Into a reactor having capacity of 5 l equipped with a stirrer, a heating and cooling means and means for supplying various starting materials and additives, the starting materials and additives were charged in the amounts (parts by weight) as identified in Table 1, and emulsion graft polymerization was conducted.

Firstly, into the above reactor, 1,500 g of a SBR latex having a solid content concentration of 50% by weight and 1,000 g of deionized water were charged, and the temperature was raised to 70° C. During the temperature rise, at 60° C., 4.5 g of sodium pyrophosphate, 1.88 g of dextrose and 0.075 g of ferrous sulfate dissolved in 150 g of water were added. When the temperature reached 70° C., 525 g of styrene, 225 g of acrylonitrile, 3.75 g of cumene hydroperoxide, 13.5 g of disproportionated potassium rosinate soap and 200 g of deionized water were added over a period of 2 hours and 30 minutes. After completion of the addition, the stirring was continued for further 30 minutes, and then the mixture was cooled to complete the reaction.

To the graft copolymer latex thus obtained, 15 g of an aging-preventive agent was added, and the mixture was added under stirring to an aqueous magnesium sulfate solution heated to 95° C., for coagulation. The coagulated product was washed with water and dried to obtain a high rubber content resin composition in the form of a white powder.

The resin composition thus obtained was blended with a styrene-acrylonitrile copolymer (weight ratio of styrene/acrylonitrile: 74/26, melt flow rate: 28 g/10 min (220° C., 10 kg)) as a general purpose styrene resin by an extruder so that the content of the rubbery polymer in the total composition would be 20% by weight, then pelletized and injection-molded to obtain test pieces. Then, various physical properties were evaluated. The results are shown in Table 1.

EXAMPLE 2

A SBR latex having a particle size of 0.1 μm were subjected to particle size enlargement with acetic anhydride to particle sizes of 0.25 μm and 0.65 μm, respectively. The reaction was conducted in the same manner as in Example 1 except that these materials were charged in the amounts (parts by weight) as identified in Table 1.

EXAMPLE 3

Using a SBR latex having a particle size of 0.35 μm, the reaction was conducted with the amount as identified in Table 1. The monomer mixture and the mixture of cumene hydroperoxide, the disproportionated potassium rosinate soap and deionized water, were added over a period of 2 hours. After completion of the addition, the reaction was continued for further 30 minutes, and the mixture was cooled to complete the reaction. Thereafter, the treatment was conducted in the same manner as in Example 1.

EXAMPLE 4

Using a SBR latex having a particle of 0.1 μm, the particle size enlargement was conducted with acetic anhydride, and then the reaction was conducted with the amount as identified in Table 1. The reaction was conducted in the same manner as in Example 1 except that the continuous charging of the mixture was conducted for 3 hours.

EXAMPLE 5

The reaction was conducted in the same manner as in Example 1 except that a polybutadiene rubber latex (PBR) having a gel content of 80% was used, and instead of cumene hydroperoxide, diisopropylbenzene hydroperoxide was employed.

EXAMPLE 6

The PBR latex was subjected to the particle size enlargement with acetic anhydride, and then the reaction was conducted with the amount as identified in Table 1. t-Dodecylmercaptane was mixed to the monomer mixture and continuously added.

COMPARATIVE EXAMPLE 1

The reaction was conducted in the same manner as in Example 1 except that the amount of dextrose was changed to 6.0 g, and t-dodecylmercaptane was changed to 7.5 g.

As shown in Table 1, the molecular weight of the graft copolymer obtained was as low as 80,000, and no adequate impact resistance was obtained, whereby the effects of the present invention were not observed.

COMPARATIVE EXAMPLE 2

The reaction was conducted in the same manner as in Example 1 except that the polymerization temperature was changed to 80° C.

As shown in Table 1, the molecular weight was low, whereby no effects of the present invention were observed.

COMPARATIVE EXAMPLE 3

The reaction was conducted in the same manner as in Example 1 except that the amount of t-dodecylmercaptane was changed to 12 g.

As shown in Table 1, the graft rate was as low as 20%, whereby no effects of the present invention were observed.

COMPARATIVE EXAMPLE 4

The reaction was conducted in the same manner as in Example 1 except that the gel content of the SBR latex used was changed to 10%.

As shown in Table 1, the impact resistance was low, whereby no effects of the present invention were observed.

COMPARATIVE EXAMPLE 5

The polymerization was conducted in the same manner as in Example 1 except that the polymerization initiator was water-soluble potassium persulfate, and the reaction temperature was changed to 80° C.

As shown in Table 1, the impact resistance was low, whereby no effects of the present invention were observed.

TABLE 1

| | Examples | | | | | | Comparative Examples | | | | |
|---|---|---|---|---|---|---|---|---|---|---|---|
| | 1 | 2 | 3 | 4 | 5 | 6 | 1 | 2 | 3 | 4 | 5 |
| Graft copolymerization | | | | | | | | | | | |
| Rubber gel content (%) | 93 | 93 | 93 | 93 | 80 | 80 | 93 | 93 | 93 | 10 | 93 |
| Rubber composition (St/Bd) | 10/90 | 10/90 | 10/90 | 10/90 | 0/100 | 0/100 | 10/90 | 10/90 | 10/90 | 20/80 | 10/90 |
| (1) Rubber partile size (μm) | 0.35 | 0.25 | 0.35 | 0.25 | 0.35 | 0.25 | 0.35 | 0.35 | 0.35 | 0.35 | 0.35 |
| Parts by weight of solid content charged | 50 | 30 | 60 | 32 | 50 | 40 | 50 | 50 | 50 | 50 | 50 |
| (2) Rubber particle size (μm) | 0 | 0.65 | 0 | 0.65 | 0 | 0.65 | 0 | 0 | 0 | 0 | 0 |
| Parts by weight of solid content charged | 0 | 20 | 0 | 8 | 0 | 10 | 0 | 0 | 0 | 0 | 0 |
| Polymerization initiator | Redox | Redox | Redox | Redox | Redox | Redox | Redox | Redox | Redox | Redox | Potassium persulfate |
| HP | 0.250 | 0.250 | 0.200 | 0.300 | 0.250 | 0.250 | 0.250 | 0.250 | 0.250 | 0.250 | |
| Dex | 0.125 | 0.125 | 0.100 | 0.150 | 0.125 | 0.125 | 0.400 | 0.125 | 0.125 | 0.125 | 0.45 |
| Styrene | 35 | 35 | 28 | 42 | 35 | 35 | 35 | 35 | 35 | 35 | 35 |
| AN | 15 | 15 | 15 | 15 | 15 | 15 | 15 | 15 | 15 | 15 | 15 |
| tDM | 0.0 | 0.0 | 0.0 | 0.0 | 0.0 | 0.1 | 0.5 | 0 | 0.5 | 0.5 | 0.1 |
| Disproportionated potassium rosinate | 0.9 | 0.9 | 0.72 | 1.1 | 0.9 | 0.9 | 0.9 | 0.9 | 0.9 | 0.9 | 0.9 |
| Polymerization temp. (°C.) | 70 | 70 | 70 | 70 | 70 | 65 | 70 | 80 | 70 | 70 | 80 |
| Polymerization time (hr) | 3.0 | 3.0 | 2.5 | 3.5 | 3.0 | 3.0 | 3.0 | 3.0 | 3.0 | 3.0 | 3.0 |
| Analyt.cal values of graft copolymer | | | | | | | | | | | |
| Graft ratio (%) | 70.0 | 72.0 | 45.0 | 93.0 | 68.0 | 60.0 | 44.0 | 50.0 | 20.0 | 52.0 | 35.0 |
| Molecular weight (Mw) X10000 | 25.0 | 30.0 | 32.0 | 22.0 | 27.0 | 23.0 | 8.0 | 13.0 | 22.0 | 22.0 | 26.0 |
| Physical property test | | | | | | | | | | | |
| Izod impact strength (kgcm/cm) | 45 | 51 | 44 | 47 | 42 | 44 | 32 | 25 | 30 | 35 | 15 |
| Falling dart impact strength (J) | 48 | 53 | 50 | 48 | 45 | 50 | 33 | 20 | 30 | 33 | 22 |
| Tensile strength (kg/cm$^2$) | 420 | 400 | 435 | 420 | 440 | 430 | 460 | 500 | 470 | 465 | 470 |
| Gloss (%) | 87 | 85 | 83 | 88 | 84 | 84 | 95 | 96 | 85 | 50 | 90 |
| Melt flow rate (g/10 min) | 10 | 9 | 12 | 12 | 13 | 10 | 18 | 22 | 17 | 10 | 22 |

Note: St: styrene, Bd: butadiene, HP: organic hydroperoxide, Dex: textrose, AN: acrylonitrile, tDM: t-dodecylmercaptan As shown in Table 1, the graft copolymer resin compositions which do not satisfy any one of the conditions specified by the present invention, are unsatisfactory in some of the physical properties, particularly in the impact resistance and/or the appearance of the molded products. In other words, the graft copolymer resin compositions according to the present invention are superior in the balance of the physical properties, particularly in the impact resistance and/or the appearance of the molded products.

What is claimed is:

1. A graft copolymer resin composition obtained by emulsion-polymerizing an aromatic vinyl monomer and a vinyl cyanide monomer, optionally together with an ethylenically unsaturated monomer copolymerizable therewith, by the action of a polymerization initiator in the presence of a latex of a conjugated diene polymer, wherein all of the monomers and polymerization initiator are continuously added to the polymerization over a period of at least 2 hours, and satisfying the following conditions:

(a) the conjugated diene polymer in the latex has a gel content of at least 50% by weight,
(b) the conjugated diene polymer in the latex has a weight average particle size of form 0.20 to 0.65 μm,
(c) the polymerization initiator is soluble in the monomers,
(d) the conjugated diene polymer ratio R in this graft copolymer resin composition is from 0.35 to 0.80,
(e) the soluble component when this graft copolymer resin composition is subjected to extraction with acetone at room temperature, has a weight average molecular weight of from 220,000 to 4000,000, and
(f) the insoluble component when this graft copolymer resin composition is subjected to extraction with acetone at room temperature, is in an amount satisfying the following formula (1) and (2):

$$Gr = \frac{y - x \cdot R \cdot 100}{x \cdot R} \quad (1)$$

$$\frac{30(1 - R)}{R} \leq Gr \leq \frac{80(1 - R)}{R} \quad (2)$$

where the symbols have the following meanings:
x: the weight of the graft copolymer resin composition sample,
y: the weight of the room temperature acetone-insoluble component in x,
R: the conjugated diene polymer ratio of conjugated diene polymer to the total amount of graft copolymer resin in the graft copolymer resin composition, and
Gr: the graft ratio (%).

2. The composition according to claim 1, wherein the conjugated diene polymer is poly-1,3-butadiene, polyisoprene, a butadiene-styrene copolymer or a butadiene-acrylonitrile copolymer.

3. The composition according to claim 1, wherein the conjugated diene polymer in the latex has a gel content of from 60 to 97% by weight.

4. The composition according to claim 1, wherein the conjugated diene polymer in the latex has a weight average particle size of from 0.25 to 0.50 μm.

5. The composition according to claim 1, wherein the aromatic vinyl monomer is styrene unsubstituted or substituted by a lower alkyl group, a lower alkoxy group, a trifluoroethyl group or a halogen atom, α- or β-vinyl naphthalene, or a mixture thereof.

6. The composition according to claim 1, wherein the vinyl cyanide monomer is acrylonitrile, methacrylonitrile, or a mixture thereof.

7. The composition according to claim 1, wherein the ethylenically unsaturated monomer is an ester of an acrylic acid or methacrylic acid with an alkanol having from 1 to 10 carbon atoms, or a diene monomer.

8. The composition according to claim 1, wherein the aromatic vinyl monomer is in an amount of from 20 to 45% by weight, based on the total amount of the monomers, and the ethylenically unsaturated monomer is in an amount of from 0 to 40% by weight, based on the total amount of the monomers.

9. The composition according to claim 1, wherein the polymerization initiator is acetyl peroxide, benzoyl peroxide, tert-butyl peroxy-2-ethylhexanoate, m-toluoyl peroxide, tert-butyl peroxyisobutyrate, 2,2'-azobisisobutylonitrile, dimethyl-2,2'-azobisisobutyrate, 4,4'-azobis-4-cyanovaleric acid, or a redox polymerization initiator which is a combination of a ferrous salt as a reducing agent with an organic hydroperoxide as an oxidizing agent.

10. The composition according to claim 1, wherein the conjugated diene polymer ratio R is from 0.40 to 0.70.

* * * * *